(12) United States Patent
Lahogue et al.

(10) Patent No.: US 11,472,094 B2
(45) Date of Patent: Oct. 18, 2022

(54) METHOD FOR MANAGING PREFORMS IMMOBILIZED IN A HEATING STATION FOLLOWING AN INTERRUPTION IN PRODUCTION

(71) Applicant: SIDEL PARTICIPATIONS, Octeville-sur-Mer (FR)

(72) Inventors: Yoann Lahogue, Octeville-sur-Mer (FR); Guy Feuilloley, Octeville-sur-Mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 0 days.

(21) Appl. No.: 17/290,625

(22) PCT Filed: Oct. 29, 2019

(86) PCT No.: PCT/FR2019/052568
§ 371 (c)(1),
(2) Date: Apr. 30, 2021

(87) PCT Pub. No.: WO2020/089557
PCT Pub. Date: May 7, 2020

(65) Prior Publication Data
US 2022/0032529 A1 Feb. 3, 2022

(30) Foreign Application Priority Data
Nov. 2, 2018 (FR) ..................... 1860130

(51) Int. Cl.
*B29C 49/42* (2006.01)
*B29C 49/64* (2006.01)
(Continued)

(52) U.S. Cl.
CPC ........ *B29C 49/6409* (2013.01); *B29C 49/786* (2013.01); *B29C 49/06* (2013.01); *B29C 49/78* (2013.01); *B29L 2031/7158* (2013.01)

(58) Field of Classification Search
CPC ............ B29C 49/4205; B29C 49/4284; B29C 49/42107; B29C 49/42109;
(Continued)

(56) References Cited

U.S. PATENT DOCUMENTS

| | | | |
|---|---|---|---|
| 4,197,071 | A | 4/1980 | Petre |
| 6,529,796 | B1 | 3/2003 | Kroeger |

(Continued)

FOREIGN PATENT DOCUMENTS

FR 3035651 A1 11/2016

OTHER PUBLICATIONS

International search report dated Feb. 14, 2020.

*Primary Examiner* — Robert B Davis

(57) ABSTRACT

The invention relates to a method for controlling confined preforms which are stopped in a heating station during a production interruption, the heating station comprising a device for conveying preforms comprising individual supports which move in a closed circuit and a heating cavity which is bordered by at least one row of transmitters of monochromatic electromagnetic radiation. The method includes a step of heating, by the transmitters of the heating cavity, the confined preforms referred to as "cold" preforms which have been stopped before being exposed to the electromagnetic radiation emitted by the transmitters.

15 Claims, 2 Drawing Sheets

(51) Int. Cl.
*B29C 49/78* (2006.01)
*B29C 49/06* (2006.01)
*B29L 31/00* (2006.01)

(58) Field of Classification Search
CPC ........ B29C 49/42382; B29C 49/42407; B29C 49/42; B29C 49/6409; B29C 49/6418; B29C 49/786
See application file for complete search history.

(56) References Cited

U.S. PATENT DOCUMENTS

| | | | |
|---|---|---|---|
| 7,425,296 B2* | 9/2008 | Cochran | ............... A23L 5/15 257/14 |
| 2010/0089906 A1* | 4/2010 | Plantamura | .......... B29B 13/023 219/645 |
| 2013/0277892 A1* | 10/2013 | Hahn | ................ B29C 49/4205 425/526 |

* cited by examiner

METHOD FOR MANAGING PREFORMS IMMOBILIZED IN A HEATING STATION FOLLOWING AN INTERRUPTION IN PRODUCTION

TECHNICAL FIELD OF THE INVENTION

The invention relates to a method for controlling confined preforms which are stopped in a heating station during a production interruption.

TECHNICAL BACKGROUND OF THE INVENTION

The invention is intended to be implemented in a production installation for receptacles of thermoplastic material and in particular polyethylene terephthalate (PET) by means of molding, in particular by means of blow-molding or stretch blow-molding, preforms. Such an installation enables receptacles to be produced in very large batches at very high speeds.

It is known to produce receptacles from thermoplastic material, such as polyethylene terephthalate (PET), using a method for molding preforms.

According to a well-known technique, such receptacles are produced in two main steps.

In a first step, a preform of PET is injection-molded. This preform comprises a substantially tubular body which is closed at one of the axial ends thereof, the opposite end being open via a neck. Following this injection-molding operation, the neck has the definitive form of the neck of the receptacle. Generally, the neck of the receptacle comprises a threaded portion.

In a second molding step, the hot preforms are accommodated in the cavities of molds. Then, a pressurized molding fluid is injected into the preforms in order to press the preform against the walls of the cavity in order to shape the preform into the final receptacle. This blow-molding operation is generally accompanied by a stretching operation which involves introducing an elongation rod into the preform via the neck thereof in order to axially stretch the wall of the preform.

In a number of cases, the preforms are produced by means of injection at a first location and are blow molded to the definitive shape of the receptacle at a second location on a specific production installation. Such a technology enables the blow-molding operation to be carried out as close as possible to the bottling location, the injection operation being able to be carried out at any location. This is because it is relatively simple and inexpensive to transport preforms of a reduced size, whilst transporting receptacles after blow-molding has the disadvantage of not being very cost-effective as a result of their very great volume.

In order to enable the molding thereof, the body of the preform is heated beyond a glass transition temperature which enables the wall of the body to be rendered malleable by substantially reducing the resilience limit thereof. In contrast, the neck is kept at a lower temperature than the glass transition temperature in order to prevent the deformation thereof. To this end, the production installation comprises a heating station which enables the body of the preforms to be heated to the required temperature in order to carry out the molding step.

Conventional heating stations are provided with filament lamps of the halogen type which shine in accordance with Planck's law over a continuous spectrum.

Before beginning any production, it is advantageous to preheat the heating station in order to bring it, using lamps, to an appropriate temperature which can confer on the preforms a thermal profile which enables the molding operation to then be carried out correctly.

This pre-heating is slow and requires complex adjustments.

Furthermore, the lamps generally radiate heat in all directions. In order to enable the efficiency of the heating station to be increased, it is known to arrange reflectors which enable the heating radiation to be reflected in the direction of the preforms.

The radiation emitted by the lamps not being directional, numerous elements of the heating station, including in particular the reflectors, accumulate heat following the pre-heating operation. Consequently, when the production is stopped in an untimely manner, the lamps being switched off does not enable an immediate reduction of the temperature inside the heating station. This is because the various heated elements return the heat accumulated by a phenomenon of thermal inertia. As a result, the preforms blocked in the heating station continue to become heated in an uncontrolled manner, which makes them unsuitable for molding. The stopped preforms heated in this manner must therefore be discarded.

BRIEF SUMMARY OF THE INVENTION

The invention proposes a method for controlling confined preforms which are stopped in a heating station during a production interruption, the heating station comprising:
  a device for conveying preforms comprising individual supports which move in a closed circuit, each individual support being intended to transport a preform with continuous movement along a predetermined transport path from an input location to an output location,
  a heating cavity which is bordered by at least one row of transmitters of monochromatic electromagnetic radiation controlled between a switched-off state and a switched-on state, the transport path extending through the heating cavity;
  the method comprising a prior step of restarting the conveying device for transporting the confined preforms in the direction of the output location;
  characterized in that the method comprises a step of heating, by the transmitters of the heating cavity, the confined preforms referred to as "cold" preforms which have been stopped before being exposed to the electromagnetic radiation emitted by the transmitters.

According to other features of the invention:
  the cold confined preforms are heated directly after restarting the conveying device when they pass into the heating cavity without being ejected from the individual support carrying them during their stoppage;
  the transmitters of the heating cavity are switched off during the production interruption and they are controlled in their switched-on state during the step of heating the cold confined preforms;
  during the heating step, the cold confined preforms are heated in accordance with a thermal profile which enables them to be subsequently molded by a molding station of the production installation;
  the preforms are heated in accordance with a predetermined thermal profile which was already applied to the preforms just before the production interruption;

the heating station is part of an installation for producing receptacles of thermoplastic material by molding heated preforms by the heating station, the preforms moving along a production flow, the method comprising a purge step during which the confined preforms which are referred to as "hot" preforms and which have been stopped after being exposed to the electromagnetic radiation transmitted by the transmitters are ejected from the production flow in the direction of a waste flow;

during the purge step, the hot confined preforms are ejected from the transport path upstream of the output location;

the hot confined preforms are ejected from the production flow downstream of the output location of the heating station.

BRIEF DESCRIPTION OF THE FIGURES

Other features and advantages of the invention will be appreciated from a reading of the following detailed description, for the understanding of which reference will be made to the appended drawings, in which.

DETAILED DESCRIPTION OF THE FIGURES

Figure 1:
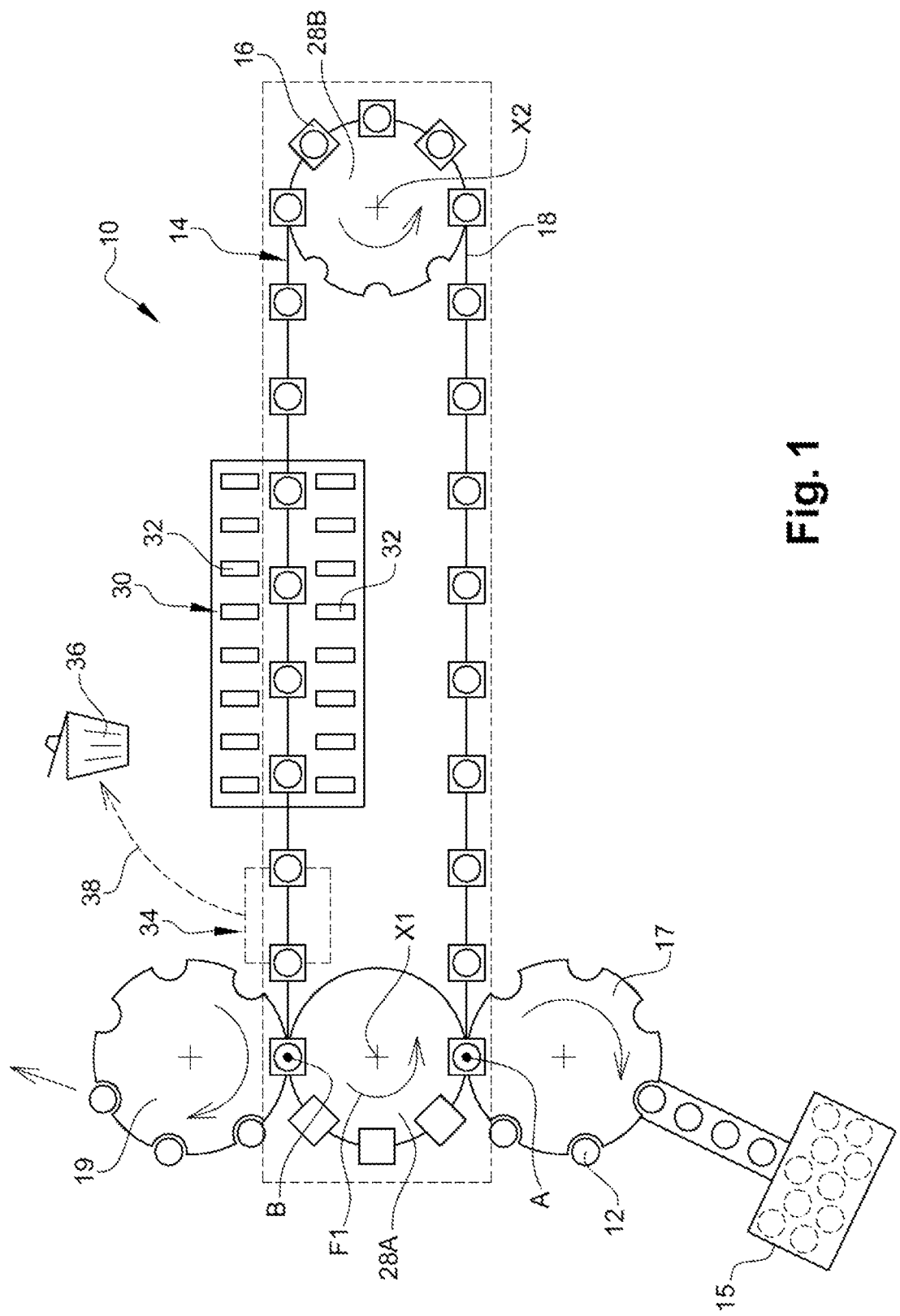
FIG. 1 is a schematic plan view of a heating station which is produced according to the aspects of teaching of the invention.

In the remainder of the description, elements which have an identical structure or similar functions will be given the same reference numeral.

In the remainder of the description, by way of non-limiting example orientations longitudinal, directed in the movement direction of the preforms along their transport path, vertical, directed in the direction of gravitational force, and transverse, indicated by the trihedron L, V, T of the Figures will be used.

In the remainder of the description, the terms "upstream" and "downstream" will be used with reference to the movement direction of the preforms along their production flow and in particular along their transport path.

FIG. 1 shows a heating station 10 for the preforms 12 of thermoplastic material. The heating station 10 belongs to an installation (not illustrated) for producing receptacles of thermoplastic material by means of molding, in particular stretch blow-molding, of the preforms 12.

The heating station 10 comprises a conveying device 14 for preforms 12 in a line. The conveying device 14 comprises individual supports 16 which move in a closed circuit in the heating station 10. Each individual support 16 is intended to transport a preform 12 with continuous movement along a predetermined transport path 18 from an input location "A" of the heating station 10 which is supplied by a line of preforms 12 as far as an output location "B" in the direction of a molding station (not illustrated), in particular for blow-molding or stretch blow-molding.

The preforms 12 thus move in a line through the production installation following a production flow from the entry location "A" of the heating station 10 to an output of the installation in the form of shaped finished receptacles after molding in the molding station. The transport path 18 forms a portion of this production flow of the preforms 12.

The preforms 12 which supply the heating station 10 come from a device 15 for aligning and straightening the preforms 12, in which the preforms 12 are discharged loosely and in which the preforms 12 are aligned and straightened. There are numerous alignment and straightening devices, such as centrifugal devices and devices with a gravitational rail. These devices are well-known and will not be set out in detail below.

The conveying device 14 is in this instance supplied with cold preforms 12 by a transfer wheel 17 which is arranged tangentially to the input location "A, whilst the hot preforms 12 are taken up individually by a transfer wheel 19 which is arranged tangentially to the output location "B". From the output location "B" to the input location "A", the individual supports 16 of the conveying device 14 run in the empty state.

Generally, each individual support 16 comprises means which are capable of driving the preform 12 in rotation about the main axis thereof during its movement along at least one portion of the transport path 18 in order to enable homogeneous heating of the body of the preform 12. Such an individual support 16 is sometimes called a "spinner".

Figure 2:
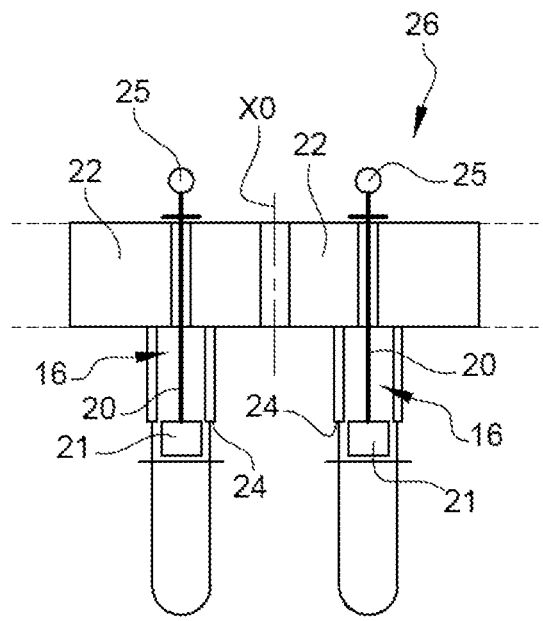
FIG. 2 is a schematic side view of a portion of a preform conveying device belonging to the heating station of FIG. 1.
Figure 3:
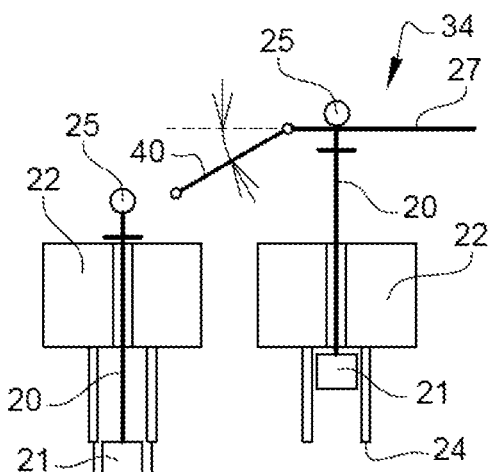
FIG. 3 is a view similar to that of FIG. 2 which illustrates the conveying device passing in the region of a waste device of the heating station.

In the embodiment illustrated in FIGS. 2 and 3, the conveying device 14 comprises in this instance a plurality of transport elements 22 which form the links of a closed transport chain 26, one portion of which can be seen in FIG. 2. The transport chain 26 is flexible. To this end, the transport elements 22 are mounted in a manner articulated to each other about vertical axes "X0". The transport chain 26 is mounted so as to be able to be moved relative to a structure which is fixed relative to the ground of the heating station 10.

With reference again to FIG. 2, each transport element 22 carries at least one individual support 16. Each individual support 16 comprises a chuck 21.

In known manner, the chuck 21 is provided with resilient means (not illustrated), such as an O-ring, which is advantageously produced from a resilient material (such as an elastomer material) and whose external diameter is equal to or slightly greater than the internal diameter of the neck of a preform 12 in order to ensure the support of the preform 12 by means of friction against the inner wall of the neck when the chuck 21 is inserted into the neck of the preform 12.

In the example illustrated in the Figures, each individual support 16 is capable of being controlled between an active position, in which the preform 12 moves in a manner fixed to the individual support 16, and an inactive position, in which the preform 12 is completely free relative to the individual support 16.

The chuck 21 is in this instance mounted so as to slide in vertical translation along a vertical axis relative to the transport element 22. The chuck 21 is fixed to the lower end of a cylindrical rod 20.

The chuck 21 is mounted so as to slide vertically relative to the transport element 22 between an inactive position, in which the chuck 21 is retracted relative to a stop face 24 (on the right in FIG. 3), and an active position (FIG. 2 and on the left in FIG. 3), in which the chuck 21 protrudes downward relative to the stop face 24 in order to be fitted in the neck of a preform 12. By way of non-limiting example, the stop face 24 is in this instance fixedly mounted relative to the transport element 22.

According to a non-limiting example, the chuck 21 is in this instance resiliently returned to the active position thereof, whilst it is controlled to move to the inactive position thereof by means of cooperation between a cam follower roller 25, which is arranged in this instance at an upper end of the rod 20, with a cam 27 which is illustrated in FIG. 3 and which acts counter to the resilient return force.

More specifically, in an active position, the chuck 21 is intended to be fitted in the neck of a preform 12, whilst, in an inactive position, the chuck 21 is intended to be removed from the neck of the preform 12, the preform 12 abutting against the stop face 24 in order to enable it to be removed.

In a variant of the invention which is not illustrated, the chuck is intended to grip the neck of the hollow body via the outer side. This variant is well-known to the person skilled in the art and will therefore not be described in greater detail below.

According to a variant of the invention which is not illustrated, the preforms are loaded on or unloaded from their support via sets of loading pincers which move together with the supports over at least a portion of their path, the sets of pincers being able to be moved axially relative to the support in order to enable the preforms to be fitted or removed from their support. In this instance, the chucks do not slide relative to the transport element. The sets of pincers are, for example, carried by a guide wheel of the transport chain.

With reference again to FIG. 1, the conveying device 14 further comprises a first wheel 28A for guiding the transport chain 26 and a second wheel 28B for guiding the transport chain 26 which are each mounted on the structure of the heating station 10 rotatably about a respective vertical axis "X1, X2". The transport chain 26 is engaged around the two guide wheels 28A, 28B. One of the two guide wheels, referred to as the leading wheel, is rotatably driven by a motor in order to move the transport chain in order to move the transport elements 22 along the closed circuit. The guide wheels 28A, 28B rotate in this instance in a counter-clockwise direction, as indicated by an arrow "F1" of FIG. 1.

In a variant of the invention which is not illustrated, the transport chain enables the preforms to be compacted by being folded in the manner of an accordion when it moves into the heating cavity, as described in detail in document EP-B1-2.623.439.

According to a variant of the invention which is not illustrated, the conveying device is formed by transport elements which are not connected to each other and which form shuttles which run on rails arranged in a closed circuit. The carriages and the rails form, for example, a linear motor, the rail forming a "stator" which is laid flat and the carriage forming a rotor of the linear motor. Such a conveying device for a heating station is, for example, described in document FR-A1-3.035.651.

Furthermore, each individual support 16 is capable of rotatably driving the preform 12 about the axis thereof during its movement along the transport path 18 in order to enable homogeneous heating of the preform 12.

According to a first example which is not illustrated, the individual support 16 is rotatably driven by a pinion which is fixedly joined to the chuck 21 and which cooperates with a fixed rack of the heating station 10.

According to another example which is not illustrated, the individual support 16 is rotatably driven using an electric motor which is fitted to the transport element 22.

With reference again to FIG. 1, the heating station 10 also comprises a heating cavity 30 through which the transport path 18 extends in order to enable the preforms 12 to be heated during their movement. The heating cavity 30 is arranged on a portion of the transport path 18, close to the output location "B" of the preforms.

The heating cavity 30 is intended to heat the bodies of the preforms 12 beyond their glass transition temperature in order to enable them to be molded by the molding station whilst they are hot.

The heating cavity 30 is bordered by a series of adjacent transmitters 32, for example, two rows of transmitters 32 opposite each other.

Each transmitter 32 is provided with sources of monochromatic electromagnetic radiation (in particular lasers) whose emission spectrum extends for the most part in the infrared range.

In theory, a monochromatic source is an ideal source which transmits a single sinusoidal frequency wave. In other words, the frequency spectrum thereof is constituted by a single ray of zero spectral width (Dirac).

In practice, such a source does not exist, a real source having a frequency transmission spectrum extending over a spectral band with a width which is small but not zero and which is centered on a main frequency where the intensity of the radiation is at a maximum. For the requirements of the present application, such a real source is considered to be a monochromatic source. In the same manner, for the requirements of the present description, a multimode source is considered to be a monochromatic source, that is to say, a source which transmits over a discrete spectrum comprising a plurality of narrow bands which are centered on different main frequencies.

The advantage of monochromatic radiation is that, correctly selected, it can be concentrated on one (or more) frequency(ies) for which the thermal behavior of the preforms 12 is, in terms of absorption, particularly advantageous.

By way of example, in order to obtain rapid heating at the surface of the preforms 12, it is possible to select one (or more) frequency(ies) in the infrared range for which the material is very absorbent. In contrast, in order to obtain slower but more homogeneous heating over the thickness of the preforms 12, it is possible to select one (or more) frequency(ies) for which the material is relatively less absorbent.

In practice, the sources with which the transmitters 32 are provided are lasers (for example, laser diodes) which transmit in the infrared range and which are organized by means of juxtaposition and superimposition in order to form one or more matrices.

In this instance, each matrix may be a laser diode matrix with a vertical cavity which transmits via the surface (VCSEL), each diode transmitting, for example, a laser beam having a unitary power in the order of a milliwatt at a wavelength of approximately 1 µm.

These sources are radiating, that is to say, the radiation emitted is transmitted to the preforms 12 without air acting as a transmission vector.

The sources convert the electrical power which is supplied to them into an electromagnetic field which is radiated in the cavity.

The transmitters 32 are controlled between a switched-off state, in which they transmit no radiation, and a switched-on state, in which they are supplied with electrical power. This electrical power may be variable. According to an embodiment which is not illustrated, the heating station advantageously comprises, for the electrical power supply of the transmitters 32, a power variator. This variator may be analogue or electronic.

During normal operation of the heating station 10, the transmitters 32 are controlled so as to heat the body of the preforms 12 in accordance with a predetermined thermal profile which is adapted to the shape of the final receptacle to be formed.

A heating station 10 which operates using this technology has numerous advantages compared with a conventional halogen lamp furnace. Inter alia, in this type of heating station 10:

the transmitters 32 radiate in the infrared range without diffusion of heat, which, in contrast to a halogen furnace, makes any ventilation unnecessary;
the preforms 12 may be heated in accordance with more precise thermal profiles;
no preheating is required.

The inventors have noted that, in addition to these known advantages, the thermal inertia of the heating station 10 has become negligible, in particular as a result of the absence of heat diffusion. In other words, the preforms 12 become heated beyond their glass transition temperature only when they are exposed directly to the radiation transmitted by the transmitters 32 in the heating cavity 30.

In the case of inadvertent interruption of the movement of the preforms 12 in the heating station 10, the preforms 12 carried by the conveying device 14 are confined inside the heating station 10. They are thus stopped on the transport path 18. Such preforms 12 will be referred to below as "confined preforms 12".

The confined preforms 12 which are stopped upstream of the heating cavity 30 have not yet been exposed to the radiation of the transmitters 32. They are therefore immersed in a cold atmosphere compared with their glass transition temperature. These preforms 12 will be referred to below as "cold confined preforms 12".

The confined preforms 12 which are stopped in the heating cavity 30 or downstream of the heating cavity have been at least partially exposed to the radiation of the transmitters 32. These preforms 12 will be referred to below as the "hot confined preforms 12" since their body has been heated to a temperature approaching or exceeding the glass transition temperature thereof.

In order to prevent the stopped confined preforms 12 in the heating cavity 30 from melting, the transmitters 32 are switched off as soon as a movement interruption of the preforms 12 is detected.

When the hot confined preforms 12 are stopped for an excessive period of time, the temperature of their body reduces slowly, which brings about a crystallization of the thermoplastic material. Such a preform 12 can no longer become malleable again by means of heating and therefore it can no longer be used to form a final receptacle. These preforms 12 are conventionally discarded.

According to an embodiment of the invention, the heating station 10 is in this instance provided with a waste device 34 which comprises ejection means for preforms 12 which are arranged along the transport path 18 downstream of the heating cavity 30 and upstream of the output location "B". The ejection means enable a preform 12 to be released selectively from its individual support 16 upstream of the output location "B". The preform 12 ejected in this manner is directed toward a waste flow 38, for example, toward a skip 36.

According to the non-limiting example illustrated in FIG. 3, the ejection means comprise in this instance a switch 40 which is controlled between a retracted position which is indicated with broken lines and in which the roller 25 of the individual support 26 passes below the cam 27, the chuck 21 thus remaining in an active position, and a fork position which is indicated with a solid line and in which the switch 40 is interposed on the path of the roller 25 in order to guide it in the direction of the cam 27 in order to control the chuck 21 to move into an inactive position and thus to eject the preform 12.

When a preform 12 is ejected via the ejection means of the waste device 34, it falls toward the waste skip 26, where applicable via the conveying slide or belt.

In a variant of the invention which is not illustrated, the hot confined preforms are ejected from the production flow of the preforms downstream of the output location "B" of the heating station, for example, in the region of the molding station, at the same time as the non-compliant receptacles after molding, or in the region of a transfer wheel which is interposed between the heating station 10 and the molding station.

The invention proposes a method which enables advantage to be taken of the fact that the material which constitutes the confined cold preforms 12 still has the structural properties which enable it to be subjected to a molding operation after heating in order to produce final receptacles. The invention more specifically proposes discarding the hot confined preforms 12 and heating the cold confined preforms 12 in order to send them to a molding station in order to convert them into final receptacles.

In this manner, in contrast to current practices, all the confined preforms 12 are not discarded. This enables a substantial saving to be made by the manufacturer of the receptacles.

According to the aspects of teaching of the invention, the cold confined preforms 12 are heated directly after the conveying device 14 has been restarted without being ejected from the individual support 16 which carried them during their stoppage. In this manner, each confined preform 12 is heated without being ejected from the individual support 16 via which it had already been carried when the conveying device 14 was interrupted.

This is because each transmitter 32 of the heating cavity 30 may be controlled individually in order to heat a preform 12 which enters without substantially heating the hot confined preforms 12 which may still be present in the heating cavity 30.

Figure 4:
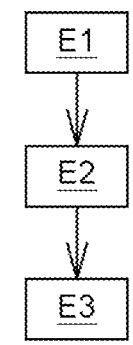
FIG. 4 is a block diagram illustrating a method for controlling preforms in the case of an interruption of the operation of the heating station of FIG. 1 produced according to the aspects of teaching of the invention.

With reference to FIG. 4, the control method comprises a first step "E1" of starting the conveying device 14 and a second purge step "E2".

Following the interruption, the first step "E1" of restarting the conveying device 14 is initiated. The confined preforms 12 are therefore moved again in the direction of the output location "B".

During a step, called the purge step "E2", the waste device 34 is controlled in order to eject, in the direction of the waste flow 38, all the hot confined preforms 12 which have been stopped after being exposed to the electromagnetic radiation transmitted by the transmitters 32. These preforms 12 may be unsuitable for molding final receptacles. This purge step "E2" begins as soon as the first hot confined preform 12 passes by the ejection means of the waste device 34 and it stops as soon as the last hot confined preform 12 has been ejected by the ejection means of the waste device 34.

The number of preforms 12 to be discarded is, for example, determined in accordance with the travel speed of the preforms. This is because the travel speed of the preforms enables the time required to discharge all the hot confined preforms 22 to be estimated taking into account the distance between the beginning of the heating cavity 30 and the waste device 34.

In a variant of the invention which is not illustrated, a detector is arranged in the installation in order to detect the passage of the hot confined preforms 12 at the waste device 34.

This detector is, for example, a temperature detector.

Furthermore, the cold confined preforms 12 are not ejected from their individual support 16 before being heated during the heating step "E3". In this manner, the transmitters 32 of the heating cavity 30 are controlled in order to heat the cold confined preforms 12 during their first and only passage through the heating cavity 30.

During this heating step "E3", the cold confined preforms 12 are heated in accordance with a thermal profile which enables them to be subsequently molded by the molding station, this is, for example, the predetermined thermal profile which was applied to the preforms 12 before the production interruption. The cold confined preforms 12 heated in this manner then leave normally via the output location "B" in the direction of the molding station in order to be subjected to the molding operation.

The invention advantageously allows substantial savings of material to be made by using cold confined preforms 12 during an untimely stoppage of the heating station in order to form receptacles. This method may be implemented in a simple and inexpensive manner.

Furthermore, the method carried out in accordance with the aspects of teaching of the invention enables the production of receptacles to be restarted very rapidly without having to completely empty the heating station 10 before restarting.

The method carried out according to any one of the embodiments can also be applied when the waste device is arranged downstream of the output location "B" of the heating station 10 but upstream of the molding station.

The invention claimed is:

1. A method for controlling confined preforms (12) which are stopped in a heating station (10) during a production interruption, the heating station (10) comprising:
    a device (14) for conveying preforms (12) comprising individual supports (16) which move in a closed circuit, each individual support (16) being intended to transport a preform (12) with continuous movement along a predetermined transport path (18) from an input location (A) to an output location (B),
    a heating cavity (30) which is bordered by at least one row of transmitters (32) of monochromatic electromagnetic radiation controlled between a switched-off state and a switched-on state, the transport path (18) extending through the heating cavity (30);
    the method comprising a step (E1) of restarting the conveying device (14) for transporting the confined preforms (12) in the direction of the output location (B); and
    a step (E3) of heating, by the transmitters (32) of the heating cavity (30), the confined preforms referred to as "cold" preforms which have been stopped before being exposed to the electromagnetic radiation emitted by the transmitters (32).

2. The method as claimed in claim 1, wherein the cold confined preforms (12) are heated directly after restarting the conveying device (14) when they pass into the heating cavity (30) without being ejected from the individual support (16) carrying them during their stoppage.

3. The method as claimed in claim 1, wherein the transmitters (32) of the heating cavity (30) are switched off during the production interruption and they are controlled in their switched-on state during the step (E3) of heating the cold confined preforms.

4. The method as claimed in claim 1, wherein, during the heating step (E3), the cold confined preforms (12) are heated in accordance with a thermal profile which enables them to be subsequently molded by a molding station of the production installation.

5. The method as claimed in claim 4, wherein the preforms (12) are heated in accordance with a predetermined thermal profile which was already applied to the preforms (12) just before the production interruption.

6. The method as claimed in claim 1, wherein the heating station (10) is part of an installation for producing receptacles of thermoplastic material by molding heated preforms by the heating station (10), the preforms (12) moving along a production flow, the method comprising a purge step (E2) during which the confined preforms (12) which are referred to as "hot" preforms and which have been stopped after being exposed to the electromagnetic radiation transmitted by the transmitters (32) are ejected from the production flow in the direction of a waste flow (38).

7. The method as claimed in claim 6, wherein, during the purge step (E2), the hot confined preforms (12) are ejected from the transport path upstream of the output location (B).

8. The method as claimed in claim 6, wherein the hot confined preforms (12) are ejected from the production flow downstream of the output location (B) of the heating station (10).

9. The method as claimed in claim 2, wherein the transmitters (32) of the heating cavity (30) are switched off during the production interruption and they are controlled in their switched-on state during the step (E3) of heating the cold confined preforms.

10. The method as claimed in claim 2, wherein, during the heating step (E3), the cold confined preforms (12) are heated in accordance with a thermal profile which enables them to be subsequently molded by a molding station of the production installation.

11. The method as claimed in claim 3, wherein, during the heating step (E3), the cold confined preforms (12) are heated in accordance with a thermal profile which enables them to be subsequently molded by a molding station of the production installation.

12. The method as claimed in claim 2, wherein the heating station (10) is part of an installation for producing receptacles of thermoplastic material by molding heated preforms by the heating station (10), the preforms (12) moving along a production flow, the method comprising a purge step (E2) during which the confined preforms (12) which are referred to as "hot" preforms and which have been stopped after being exposed to the electromagnetic radiation transmitted by the transmitters (32) are ejected from the production flow in the direction of a waste flow (38).

13. The method as claimed in claim 3, wherein the heating station (10) is part of an installation for producing receptacles of thermoplastic material by molding heated preforms by the heating station (10), the preforms (12) moving along a production flow, the method comprising a purge step (E2) during which the confined preforms (12) which are referred to as "hot" preforms and which have been stopped after being exposed to the electromagnetic radiation transmitted by the transmitters (32) are ejected from the production flow in the direction of a waste flow (38).

14. The method as claimed in claim 4, wherein the heating station (10) is part of an installation for producing receptacles of thermoplastic material by molding heated preforms by the heating station (10), the preforms (12) moving along a production flow, the method comprising a purge step (E2) during which the confined preforms (12) which are referred to as "hot" preforms and which have been stopped after being exposed to the electromagnetic radiation transmitted by the transmitters (32) are ejected from the production flow in the direction of a waste flow (38).

15. The method as claimed in claim 5, wherein the heating station (10) is part of an installation for producing receptacles of thermoplastic material by molding heated preforms by the heating station (10), the preforms (12) moving along a production flow, the method comprising a purge step (E2) during which the confined preforms (12) which are referred to as "hot" preforms and which have been stopped after being exposed to the electromagnetic radiation transmitted by the transmitters (32) are ejected from the production flow in the direction of a waste flow (38).

\* \* \* \* \*